United States Patent Office 3,024,242
Patented Mar. 6, 1962

3,024,242
3-AMINO-N-NITRO-2-OXO-1-PIPERIDINE-CARBOXAMIDINE
Miklos Bodanszky, Princeton, and Frederick Y. Wiselogle, North Brunswick, N.J., assignors to Olin Mathieson Chemical Corporation, New York, N.Y., a corporation of Virginia
No Drawing. Filed Sept. 9, 1960, Ser. No. 54,859
4 Claims. (Cl. 260—294.7)

This invention relates to new chemical compounds and more particularly to a new piperidine base of the formula

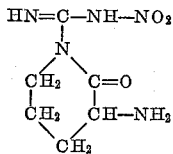

and acid-addition salts thereof. Although any acid may be used to prepare the salts of this invention, the preferred acids are those which form non-toxic salts with the base of this invention. Included among such acids are the mineral acids, such as sulfuric, nitric, phosphoric and the hydrohalic acids (e.g., hydrobromic and hydrochloric acid); and organic acids, such as tartaric, acetic, citric, oxalic and maleic acid.

To prepare the compounds of this invention, Nα-benzyloxy-carbonyl-nitro-L-arginine is reacted with N,N'-dicyclohexyldiimide to form the benzyl ester of 1-N-nitroamidino-2-oxo-3-piperidine-carbamic acid. The ester is then treated with an acid to yield the acid-addition salt of 3-amino-N-nitro-2-oxo-1-piperidine-carboxamidine. To prepare the free base, the acid-addition salt is treated with an anion-exchange resin (e.g., Amberlite IR–400 and IR–410) in its hydroxyl form and the free base recovered from the effluent. The base, thus obtained, can then be treated with any desired acid in the usual manner to yield other acid-addition salts of this invention. Acid-addition salts may also be formed by metathesis using as reactants a different acid-addition salt of the base of this invention and an anion exchange resin in the form of the desired acid salts.

The compounds of this invention are physiologically active substances which possess both sedative and antitussive activities. When used for these purposes the compounds of this invention are formulated for peroral administration, the dosage depending upon the activity of the particular compound.

The following examples illustrate the preparation of the compounds of this invention (all temperatures being in centigrade):

EXAMPLE 1

*3-Amino-N-Nitro-2-Oxo-1-Piperidinecarboxamidine Hydrobromide*

(a) *Preparation of benzyl 1-N-nitroamidino-2-oxo-3-piperidinecarbamate.*—A mixture of 0.7 g. of Nα-benzyloxycarbonyl-nitro-L-arginine and 0.45 g. of N,N'-dicyclohexyldiimide is dissolved in 25 ml. of ethyl acetate containing 4 ml. of dimethylformamide and allowed to stand at room temperature. Almost immediately N,N'-dicyclohexylurea begins to separate. On standing overnight additional by-product urea separates. One-half cc. of glacial acetic acid is added to the mixture and the solvent evaporated. The residue is taken up in 50 ml. of ethanol and filtered. The filtrate is concentrated to about 20 ml. when crystals begin to appear. On standing addition material is obtained; M.P. about 143–146°.

*Analysis.*—Calcd. for $C_{14}H_{17}N_5O_5$: C, 50.14; H, 5.11; N, 20.89. Found: C, 50.54; H, 5.59; N, 20.84.

(b) *Preparation of 3-amino-N-nitro-2-oxo-1-piperidinecarboxamidine hydrobromide.*—To a mixture of 0.67 g. of benzyl 1-N-nitroamidino-2-oxo-3-piperidinecarbamate in 6 ml. of glacial acetic acid is added 6 ml. of a 36% solution of hydrogen bromide in acetic acid. The mixture is allowed to stand for 20 minutes at room temperature. The solution is then diluted with 100 ml. of ether and a white solid precipitates. The precipitate is filtered off and washed with ether. It is then triturated with absolute ethanol and washed on the filter with ethanol. The yield of material is about 0.4 g. It is dissolved in 95% ethanol and precipitated by the addition of ether. Crystals separate [M.P. about 227–228° (dec.); yield about 0.37 g.].

*Analysis.*—Calcd. for $C_6H_{11}N_5O_3 \cdot HBr$: N, 24.8; Br, 28.3. Found: N, 25.0; Br, 28.5.

EXAMPLE 2

*3-Amino-N-Nitro-2-Oxo-1-Piperidinecarboxamidine*

3-amino-N-nitro-2-oxo-1-piperidinecarboxamidine hydrobromide is dissolved in a small amount of water and the resulting solution treated with portions of an anion exchange resin (Amberlite IR–400) in its hydroxyl form. After each addition of resin the mixture is agitated. The addition of resin is continued until the solution gives a negative test for bromide ion. The resin is then removed by filtration and washed with water. The combined filtrate and washings are concentrated to a small volume and the concentrate lyophylized to yield 3-amino-N-nitro-2-oxo-1-piperidinecarboxamidine.

EXAMPLE 3

*3-Amino-N-Nitro-2-Oxo-1-Piperidinecarboxamide Sulfate*

A solution of 3-amino-N-nitro-2-oxo-1-piperidinecarboxamidine hydrobromide is passed through a column containing an anion exchange resin (Amberlite IR–400) in its sulfate cycle. The effluent contains the sulfate salt of 3-amino-N-nitro-2-oxo-1-piperidinecarboxamidine which is recovered from the solution by lyophilization.

The invention may be variously otherwise embodied within the scope of the appended claims.

What is claim is:
1. A compound selected from the group consisting of 3-amino-N-nitro-2-oxo-1-piperidinecarboxamidine and the nontoxic acid addition salts thereof.
2. 3-amino-N-nitro-2-oxo-1-piperidinecarboxamidine hydrobromide.
3. 3-amino-N-nitro-2-oxo-1-piperidinecarboxamidine.
4. A process for preparing an acid-addition salt of 3-amino-N-nitro-2-oxo-1-piperidinecarboxamidine which comprises treating benzyl 1-N-nitroamidino-2-oxo-3-piperidinecarbamate with hydrogen bromide in acetic acid.

No references cited.